(12) United States Patent
Dubash et al.

(10) Patent No.: US 7,551,127 B2
(45) Date of Patent: Jun. 23, 2009

(54) RECONFIGURABLE DOWNCONVERTER FOR A MULTI-BAND POSITIONING RECEIVER

(75) Inventors: Noshir B. Dubash, Chandler, AZ (US); Thomas M. King, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 468 days.

(21) Appl. No.: 11/054,734

(22) Filed: Feb. 10, 2005

(65) Prior Publication Data

US 2006/0176215 A1 Aug. 10, 2006

(51) Int. Cl.
*G01S 1/00* (2006.01)
(52) U.S. Cl. .................................. 342/357.06
(58) Field of Classification Search ................ 455/302, 455/23, 24, 456.1, 259, 296, 313, 318, 323, 455/324, 78, 84, 76, 73, 552, 553, 189.1, 455/180.2, 190.1, 188.2; 342/357.01–357.17; 370/208, 206, 33, 465, 480; 375/219, 260, 375/261
See application file for complete search history.

(56) References Cited

U.S. PATENT DOCUMENTS

| | | | | |
|---|---|---|---|---|
| 3,913,028 | A * | 10/1975 | Bosselaers | 331/1 A |
| 5,040,240 | A | 8/1991 | Keegan | |
| 5,108,334 | A * | 4/1992 | Eschenbach et al. | 455/314 |
| 5,303,417 | A * | 4/1994 | Laws | 455/314 |
| 5,347,284 | A * | 9/1994 | Volpi et al. | 342/356 |
| 5,537,121 | A * | 7/1996 | Lennen | 342/357.12 |
| 5,678,169 | A * | 10/1997 | Turney | 455/1 |
| 5,883,597 | A | 3/1999 | DeWulf | |
| 6,005,506 | A * | 12/1999 | Bazarjani et al. | 341/143 |
| 6,081,691 | A | 6/2000 | Renard et al. | |
| 6,088,348 | A | 7/2000 | Bell, III et al. | |
| 6,104,340 | A * | 8/2000 | Krasner | 342/357.1 |
| 6,104,764 | A * | 8/2000 | Ohta et al. | 375/332 |
| 6,259,902 | B1 | 7/2001 | Siomkos et al. | |
| 6,307,896 | B1 * | 10/2001 | Gumm et al. | 375/316 |
| 6,480,557 | B1 * | 11/2002 | Rog et al. | 375/349 |
| 6,516,184 | B1 * | 2/2003 | Damgaard et al. | 455/86 |
| 6,549,766 | B2 * | 4/2003 | Vorenkamp et al. | 455/307 |
| 6,609,010 | B1 | 8/2003 | Dolle et al. | |
| 6,643,320 | B1 * | 11/2003 | Wilcox et al. | 375/150 |
| 6,662,367 | B2 * | 12/2003 | Dapper et al. | 725/105 |

(Continued)

FOREIGN PATENT DOCUMENTS

WO WO 01/39364 A1 5/2001

OTHER PUBLICATIONS

Phase Locked Loop Basics- An introduction to Phase Locked Loop.*

*Primary Examiner*—Thomas H Tarcza
*Assistant Examiner*—Nga X Nguyen
(74) *Attorney, Agent, or Firm*—Brian M. Mancini; Valerie M. Davis

(57) ABSTRACT

A reconfigurable downconverter (10) for a multi-band positioning receiver is operable with an RF synthesizer (18) with fixed output frequency, and a fixed wideband RF input (28). The downconverter (10) includes an RF mixer (12) operable to accept a range of frequencies that encompass the GPS and Galileo frequency bands and to output a downconverted IF signal (32). A fixed frequency local oscillator signal (34) is coupled to the RF mixer (12). At least one IF processor 14 further downconverts the downconverted IF signal (32) to at least one baseband signal (22). At least one of the IF processors (14) is reconfigurable for different frequency bands.

15 Claims, 4 Drawing Sheets

U.S. PATENT DOCUMENTS

| | | | |
|---|---|---|---|
| 6,675,003 B1 * | 1/2004 | Dubash et al. | 455/302 |
| 6,801,583 B1 * | 10/2004 | Claxton et al. | 375/316 |
| 6,937,872 B2 * | 8/2005 | Krasner | 455/502 |
| 7,035,613 B2 * | 4/2006 | Dubash et al. | 455/302 |
| 7,047,023 B1 * | 5/2006 | Tso | 455/456.6 |
| 7,082,292 B2 * | 7/2006 | Underbrink | 455/255 |
| 7,123,892 B2 * | 10/2006 | Li et al. | 455/142 |
| 2002/0051503 A1 * | 5/2002 | Takahiko | 375/327 |
| 2002/0173337 A1 | 11/2002 | Hajimiri et al. | |
| 2003/0040292 A1 * | 2/2003 | Peterzell et al. | 455/147 |
| 2003/0157912 A1 * | 8/2003 | Atkinson et al. | 455/234.1 |
| 2004/0012387 A1 * | 1/2004 | Shattil | 324/225 |
| 2004/0130484 A1 * | 7/2004 | Krasner | 342/357.02 |
| 2004/0248537 A1 * | 12/2004 | Zellweger et al. | 455/260 |
| 2004/0263378 A1 * | 12/2004 | Jossef et al. | 342/20 |
| 2004/0266376 A1 * | 12/2004 | Cowley et al. | 455/150.1 |
| 2005/0058185 A1 * | 3/2005 | Mattos | 375/150 |
| 2005/0079838 A1 * | 4/2005 | Li et al. | 455/142 |
| 2005/0080564 A1 * | 4/2005 | Tso et al. | 701/214 |
| 2006/0111074 A1 * | 5/2006 | Petilli et al. | 455/334 |
| 2006/0189290 A1 * | 8/2006 | Olson | 455/285 |
| 2006/0262838 A1 * | 11/2006 | Birkett et al. | 375/219 |

* cited by examiner

RECONFIGURABLE DOWNCONVERTER FOR A MULTI-BAND POSITIONING RECEIVER

FIELD OF THE INVENTION

The present invention is generally directed to the field of electronic receiving equipment, and specifically for positioning receivers for downconverting signals from multiple frequency bands.

BACKGROUND OF THE DISCLOSURE

Currently most civilian positioning receivers are single-band Global Positioning System (GPS) receivers. These receivers use the L1-CA code broadcast by GPS satellites at a frequency 1575.42 MHz, as defined for GPS protocols. The performance of these receivers is limited by the signal strength, chip rate, data rate, code length and availability of the L1-CA signal. Due to the modernization plan of the United States GPS system and the planned deployment of the European Galileo system, more satellite signals will be available in the near future for civilian use. These signals will dramatically improve the capability and performance of positioning receivers by offering higher code rates and data rates, longer codes, higher power, frequency diversity, and increased availability.

The GPS modernization plan includes introducing two additional satellite signals for civilian use: L2 at 1227.6 MHz and L5 at 1176.45 MHz. The European Galileo system will offer thirty new satellites, with positioning signals in four frequency bands: E5a at 1176.45 MHz, E5b at 1207.14 MHz, E6 at 1278.75 MHz and E2 at 1575.42 MHz. Although some of the Galileo bands coincide with the GPS bands, they are designed to not interfere with the GPS signal codes.

To take full advantage of these additional signals, future positioning receivers will need to operate in multiple frequency bands. The problem is that each additional band will require additional hardware with additional cost, which is prohibitive for many low-cost civilian applications. Also, since it is not practical to implement all the bands, a receiver developer must decide which bands to include in the receiver, without any test data of how these new signals will perform when deployed. The problem is how to design a dynamically reconfigurable multi-band receiver, with minimum hardware and cost.

Several multi-band architectures and methods have been proposed for dual band receivers using L1 and L2 GPS frequencies. U.S. Pat. No. 5,736,961 uses different fixed-frequency downconverters for the L1 and L2 signal with complete duplication of the downconversion hardware. This is not a practical dual-band solution, and not scalable to more frequencies. U.S. Pat. No. 5,040,240 also uses separate receiver chains for L1 and L2 frequencies, but shares a common frequency synthesizer. Therefore, this technique also suffers from duplication of hardware. The receiver disclosed in U.S. Pat. No. 6,675,003 separates the L1 and L2 signals at a second image reject mixer. This is an efficient solution for a L1/L2 dual-band receiver but is not scalable to more frequencies without significant increase in hardware.

U.S. Pat. No. 6,081,691 discloses a GPS/GLONASS (Global Orbiting Navigation Satellite System) receiver capable of receiving satellite signals from a single-frequency GPS system and a multiple-frequency GLONASS system, and WIPO Patent Application WO 01/39364 presents another method of implementing a multi-band GPS/GLONASS receiver. For both these references, the IF processing paths are fixed and cannot be electronically reconfigured for different frequencies. Moreover, the GLONASS system, which has been in decline since 1996 has a limited lifetime.

There is other prior art that covers multi-band receivers in general, used for any application. For example, U.S. Patent Application 2002/0173337 A1 and U.S. Pat. No. 6,088,348 disclose dual-band or tri-band architectures for cellular, PCS and GPS frequencies. However, these architectures use separate mixers for the first down-conversion, and switched PLL synthesizers, which adds additional hardware cost and complexity.

What is needed is an improved electronically reconfigurable downconverter for a multi-band positioning receiver. It would also be of benefit to provide such improvement with a receiver having a minimum of additional hardware requirements

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF EMBODIMENTS OF THE INVENTION

The present invention describes an electronically reconfigurable downconverter receiver apparatus for a multi-band positioning receiver, which can select and downconvert any two or more baseband signals, from two or more RF carrier bands. With four or more different satellite positioning frequencies available for civilian use by the year 2010, the ideal civilian positioning receiver may be one with two downconversion channels, which can be set to any of the available frequencies. The reconfigurable downconverter of the present invention, as described herein, can provide this functionality. The downconverter is used with a fixed RF synthesizer and a fixed wideband RF input, wherein all selection and reconfiguration is done at IF frequencies. Advantageously, this apparatus minimizes the power consumption and hardware required.

Figure 1:
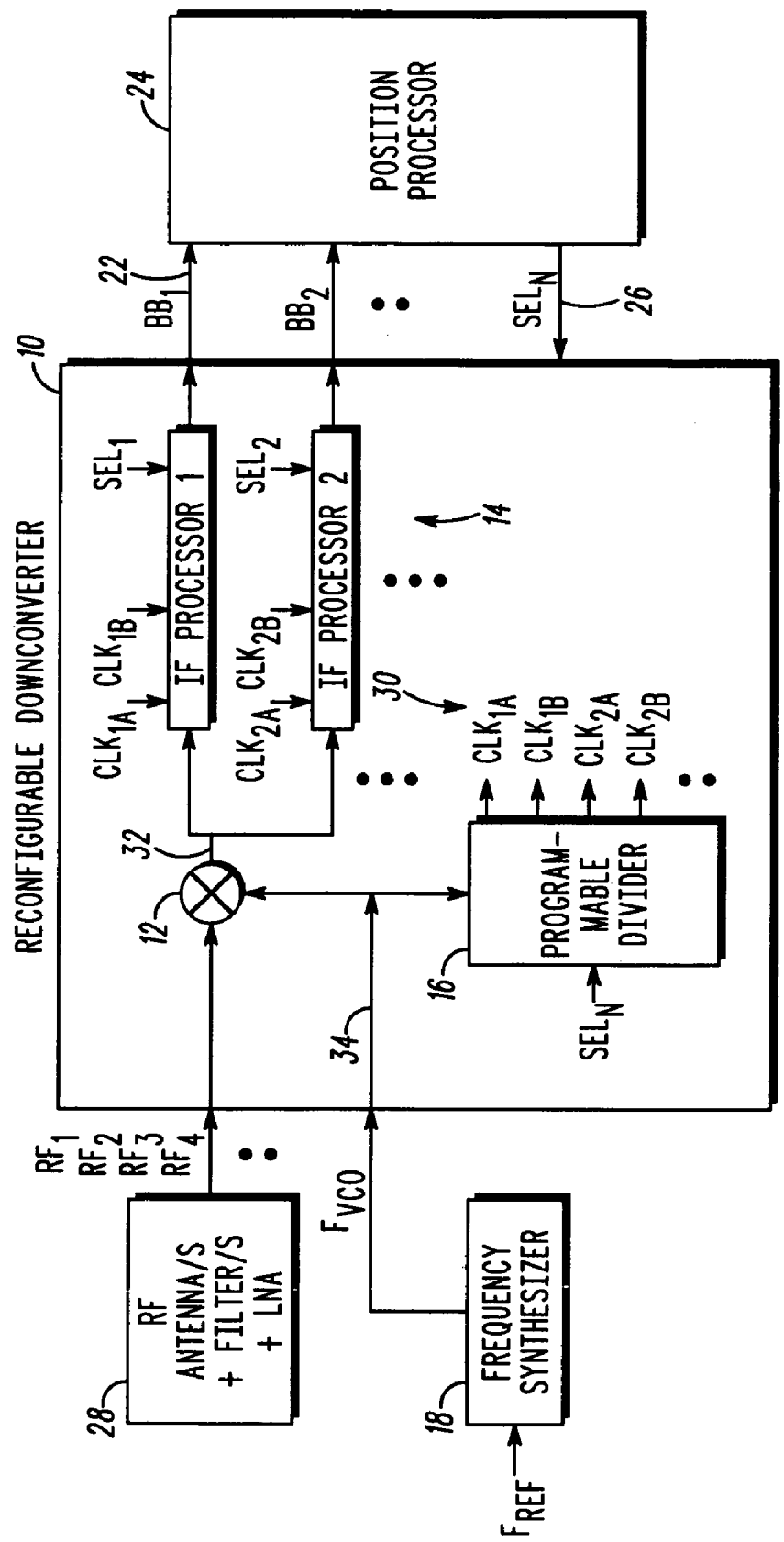
FIG. 1 is a schematic diagram of a multi-band positioning receiver, in accordance with the present invention.

Referring to FIG. 1, the reconfigurable downconverter 10 consists of a fixed RF mixer 12, with RF input received from a wideband RF front-end 28, which can receive any of the Galileo or GPS frequencies from approximately 1176.45 MHz to approximately 1575.42 MHz. The RF mixer 12 is driven by a fixed frequency local oscillator signal 34 produced by a fixed frequency synthesizer 18. The downconverted IF signal 32 is then further downconverted, filtered, amplified and sampled by two or more IF processors 14, depending on how many signals are required simultaneously. At least one of the IF processors 14 is reconfigurable for different frequency bands. The outputs of the reconfigurable downconverter are the baseband samples 22 of the desired frequency bands.

Also included in the reconfigurable downconverter 10 is a programmable frequency divider 16 which produces all the clock signals 30 required for the IF processors 14 and IF processing. A position processor 24 provides control signals 26 that are used to select the frequency band and change the functionality of the reconfigurable IF processor(s) 14 and the programmable frequency divider 16. These control signals 26 can be set dynamically by the position processor hardware and/or can be set by the software that controls the position processor. The position processor identifies the satellites for each band selected by matching the PRN codes, decodes the data transmitted by the satellites and computes position. The synthesizer 18, RF Mixer 12 and all RF circuitry 28 in front of the mixer remain unchanged for different frequency bands. It is assumed that the antenna, filters, and low-noise amplifier (LNA) 28 in front of the mixer 12 are either wideband or multi-band elements.

Figure 2:
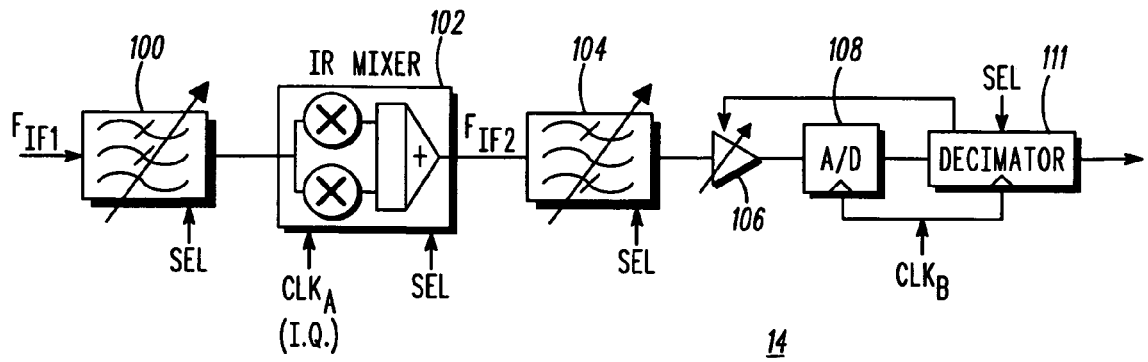
FIG. 2 is a schematic diagram of a reconfigurable IF processor, in accordance with the present invention.
Figure 3:
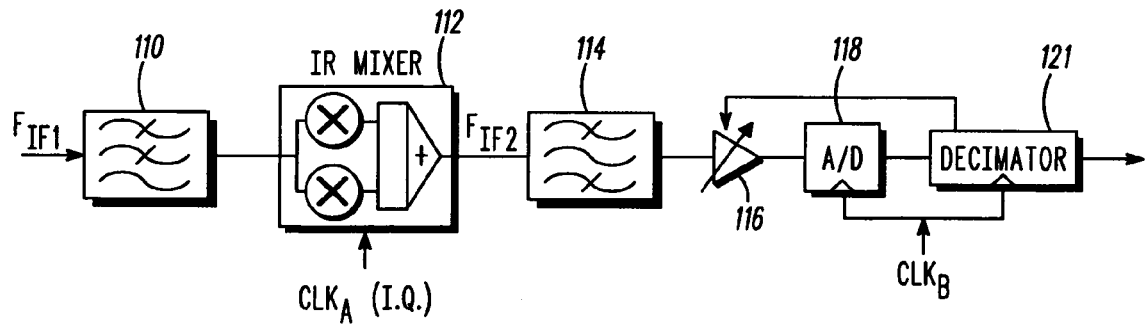
FIG. 3 is a schematic diagram of a fixed-band IF processor, in accordance with the present invention.

Referring to FIG. 2, a reconfigurable IF processor 14 consists of an image-reject mixer 102 with adjustable polyphase filter, one or more IF filters 100, 104 with variable bandwidth and frequency, a variable gain amplifier 106, an A/D converter 108 with variable sample-rate capability, and a decimator 111 with programmable decimation ratios. If a fixed IF processor 14 is used, it will consist of an image-reject mixer 112, one or more IF filters 110, 114, variable gain amplifier 116, A/D converter 108, and decimator 121, as illustrated in FIG. 3.

The reconfigurable IF processor of FIG. 2 can be easily implemented in modern integrated circuit technology using BiCMOS or CMOS process technology. The first filter 100 is preferably a lowpass filter, which needs to filter higher frequency mixing products from the first mixer. The cutoff frequency of the first filter 100 will be slightly higher than the first IF frequency, $F_{IF1}$. This lowpass filter 100 may be a simple passive or active RC filter, which can switch between different capacitor or resistor values depending on the configuration signal SEL.

The image-reject mixer 102 consists of two double balanced mixers to produce a second IF in the range of about 4 to 20 MHz. The IR mixer is driven by the I-phase and Q-phase of the local oscillator signal, $CLK_A$. The mixer 102 has input and output bandwidths wide enough to cover the range of the GPS and Galileo frequencies desired. The IR mixer is needed due to the wideband front end passing the signal of interest along with image frequencies. The double balanced mixers are followed by a polyphase filter and combiner. The polyphase filter may be a simple passive RC polyphase, with as many orders as is required to meet the image rejection and bandwidth requirements of the receiver. The polyphase frequency can be adjusted by the switching resistors or capacitors in the polyphase, as controlled by SEL. In operation, the polyphase filter shifts (rotates) the phase of the signal such that the combiner adds the frequency of interest and cancels the image frequency.

The image reject mixer 102 is followed by a higher order multi-pole bandpass filter 104 centered at the second IF frequency, $F_{IF2}$. The bandwidth of the filter 104 is selected depending upon the bandwidth of the positioning signal code. For example; the GPS L1/CA code with chip rate of about 1 Mbit/s, would require a minimum filter bandwidth of 2 MHz; whereas the GPS L5 code, with chip rate of about 10 Mbit/s would require a minimum filter bandwidth of 20 MHz. The actual bandwidth, which may be greater than the minimum bandwidth, will depend on the receiver requirements, as this filter usually sets the noise bandwidth of the receiver, and on the alias frequencies due to sampling, which need to be rejected. The alias frequencies are determined by the ratio of $F_{IF2}$ to $CLK_B$. Although there are many possible topologies for implementation of the bandpass filter, a Gm-C topology may be most optimal since it is easily tunable by Gm.

The variable gain amplifier 106, A/D converter 108, and decimator 111 form a gain control loop which regulates the total gain in the receiver chain. The A/D converter 108 is designed to handle the maximum sampling frequency required. The decimator 111 reconfiguration involves simple reconfiguration of the digital logic that decimates and averages the samples from the A/D converter 108. Note that because the GPS and Galileo signals are spread-spectrum signals below the noise floor of the receiver, the gain control loops operates on amplified noise and not on the actual strength of the position signals. In effect, the decimator determines the noise power incident at the A/D converter and provides a feedback control signal back to the VGA 106 to maintain the A/D input power to a preset level. The decimator 111 is reconfigured by the SEL signal to decimate the signal differently depending upon the second IF frequency, $CLK_B$, and the chip-rate of the positioning signal selected. $CLK_B$ is set to provide the proper ratio to obtain the I and Q samples of the signal in order to simplify processing. For example, a 16 MHz $CLK_B$ will be able to detect the I and Q samples of a 4 MHz second IF frequency.

Figure 4:
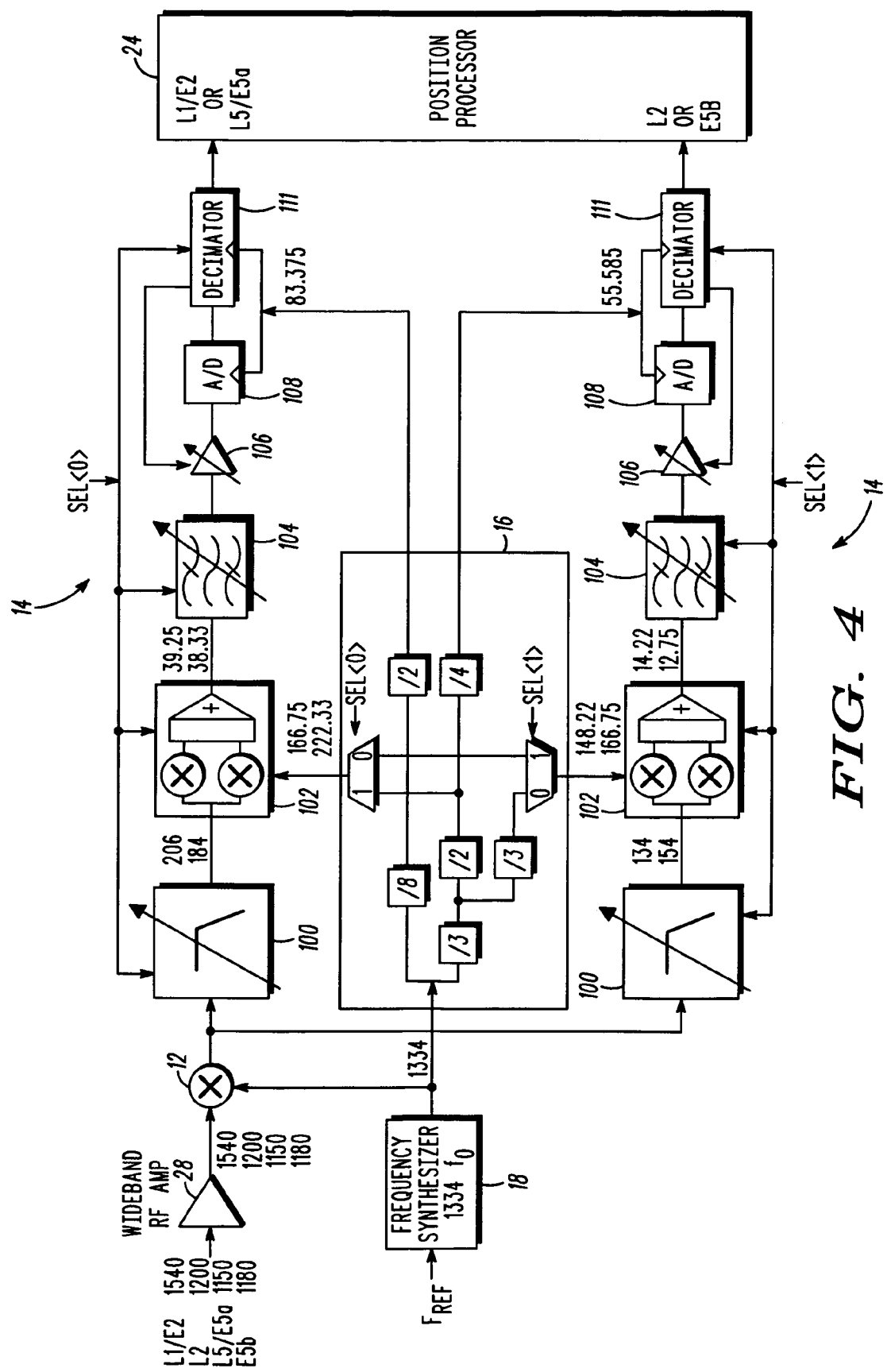
FIG. 4 is a schematic diagram of a preferred embodiment of a multi-band positioning receiver, in accordance with the present invention.

In practice, and referring to FIG. 4, the present invention provides a practical frequency plan and receiver configuration capable of downconverting four RF frequencies bands, including three GPS signals (L1, L2, L5) and three Galileo signals (E5a, E5b, E2). Note that L1 and E2 share the same frequency, as do L5 and E5a, as shown below in Table 1. The frequencies are also listed in units of $f_0$=1.023 MHz, which is an integer divisor of all carrier frequencies and chip rates of GPS and Galileo signals. For the remainder of this section, frequencies will be expressed in units of $f_0$, for simplicity.

TABLE 1

| | Input Frequencies | |
|---|---|---|
| Band Name/s | Frequency (MHz) | Frequency ($f_0$) |
| L1/E2 | 1545.42 | 1540 |
| L2 | 1227.60 | 1200 |
| L5/E5a | 1176.45 | 1150 |
| E5b | 1207.14 | 1180 |

In a preferred embodiment, the downconverter uses two reconfigurable IF processors. The first IF processor for downconverting L1/E2 or L5/E5a signals, and the second IF processor for downconverting L2 or E5b signals. Thus, the receiver has four different modes, each of which can handle two signals simultaneously, as show in Table 2. The modes are selected by a two-bit control signal SEL<0:1>.

TABLE 2

| | Selection Modes | |
|---|---|---|
| SEL<0> | SEL<1> | Bands |
| 0 | 0 | L1/E2 and L2 |
| 1 | 0 | L5/E5a and L2 |
| 0 | 1 | L1/E2 and E5b |
| 1 | 1 | L5/E5a and E5b |

It should be noted that L1 and L2 signals have a chip-rate of $1f_0$, whereas L5, E5a and E5b have chip-rate of $10f_0$. Thus, the SEL<0:1>=00 mode will have the lowest power consumption, whereas the SEL<1:1> mode will offer the best performance with higher power consumption. E5a and E5b are designed to minimize code noise when used simultaneously. If only one frequency band is required, as in a strong signal environment, the IF processor hardware for the other band can be turned off to save power.

The synthesizer's output frequency is fixed at $1334f_0$, which is also the fixed local oscillator frequency for the first mixer. The synthesizer may be a conventional PLL synthesizer or a fractional-N synthesizer. The frequency of $1334f_0$ is carefully selected to minimize complexity and power consumption of the receiver: the required clocks ($CLK_{1A}$, $CLK_{1B}$, $CLK_{2A}$, $CLK_{2B}$ ... $CLK_{xn}$) are generated by simple integer divisions of the $1334f_0$ signal. The dividers required are illustrated in FIG. 4, along with all IF and CLK frequencies. All frequencies denoted on FIG. 4 are in units of $f_0$. Note that the $2^{nd}$ IF frequencies for each IF processor are close enough so that the center frequency of the bandpass filters does not need to be tunable; only the bandwidth need be tunable. The low pass filters used in front of the image-reject mixer could be fixed if the rejection does not need to be optimum. The frequency plan for all four modes is detailed in Table 3.

TABLE 3

Frequency Plan (frequencies in units of $f_0$ = 1.023 MHz)

| Band | $F_{RF}$ | $F_{LO}$ | $F_{IF1}$ | $CLK_A$ | $F_{IF2}$ | $CLK_B$ |
|---|---|---|---|---|---|---|
| L1/E2 | 1540 | 1334 | 206 | 166.75 | 39.25 | 83.375 |
| L2 | 1200 | 1334 | 134 | 148.22 | 14.22 | 55.585 |
| L5/E5a | 1150 | 1334 | 184 | 222.33 | 38.33 | 83.375 |
| E5b | 1180 | 1334 | 154 | 166.75 | 12.75 | 55.585 |

Since the magnitude of clock signals in the downconverter are much larger than the position codes of the chosen satellite system, which are buried in the noise floor, the clock frequencies must be carefully chosen to avoid jamming any of the IF bands by any clock harmonic. The codes and therefore IF bands for the L1 and L2 signals are $2f_0$ wide null-to-null, centered on the L1 and L2 frequencies, whereas the codes/IF-bands for the L5, E5a and E5b signals are $20f_0$ wide null-to-null, centered on their respective frequencies.

Figure 5:
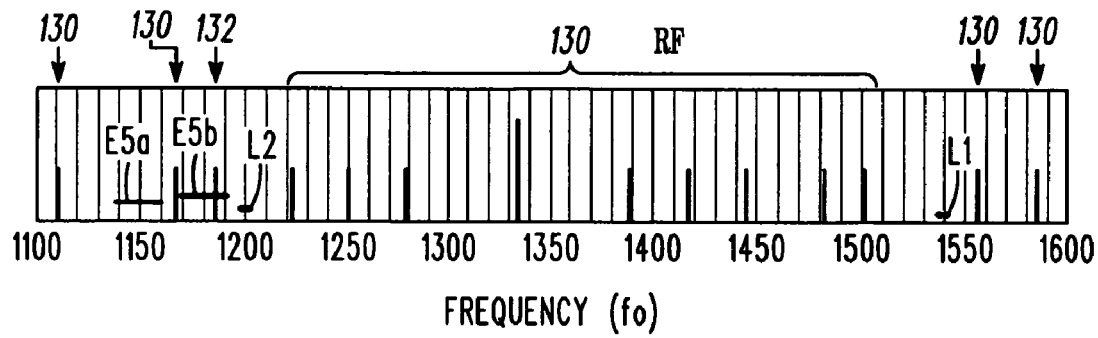
FIG. 5 is a graphical representation of the operable RF and IF frequency bands of the embodiment of FIG. 4.
Figure 5:
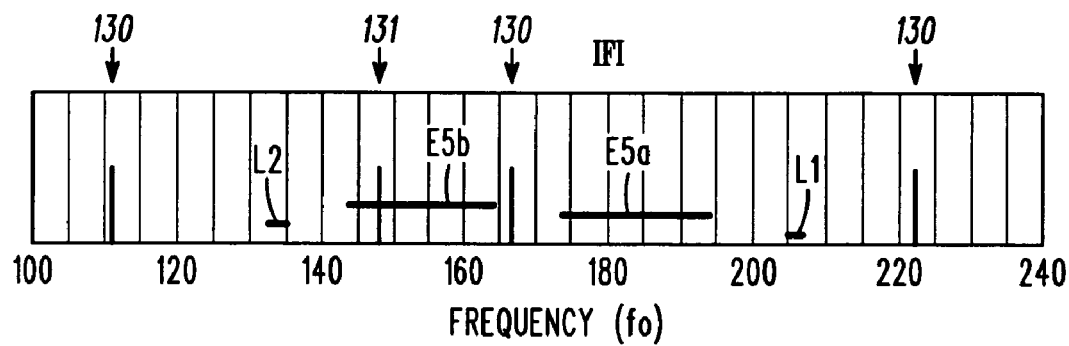
Figure 5:
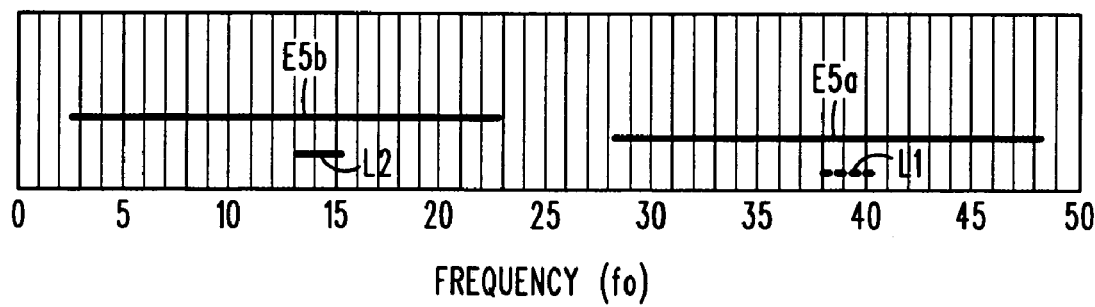

A spurious analysis was done for the frequency plan represented in FIG. 4 and Table 3. The results are graphically represented in FIG. 5 for the RF, 1st IF, and 2nd IF frequencies. The spurs 130 are the harmonics of all clock signals. Note that the only possible contention is the spur 131 at $148.22f_0$ in the E5b IF1 band, and the spur 132 at $1185.78f_0$ ($=8\times148.22f_0$) in the E5b RF band. However, the $148.22f_0$ clock is only used when the lower IF processor in FIG. 4 is tuned to L2, and in that case E5b is not being used, so these spurs 131, 132 do not pose a problem.

Advantageously, electronically reconfigurable IF processing minimizes the hardware duplication that would otherwise be required for multiple frequency bands. This becomes increasingly important as the number of frequencies increases beyond two frequencies, which cannot be addressed by the prior art. The reconfigurable IF processors also enable automatic selection of the frequency bands by the digital processor. Using this feature the processor can optimize performance and power depending on the user location and needs. No tuning of the synthesizer VCO is necessary to switch between different frequency bands, providing a stable synthesizer with well defined spurious characteristics, and no settling time required between frequency band changes. In the present invention, the chosen VCO frequency enables all necessary clocks and LO signals to be derived from the synthesizer frequency using simple integer dividers, which minimizes power consumption and hardware.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A reconfigurable downconverter for a multi-band receiver comprising:
    a fixed frequency local oscillator generating a fixed frequency local oscillator signal;
    a fixed radio frequency (RF) mixer operable to accept a predetermined wide range of frequencies and output a first downconverted intermediate frequency (IF) signal under the control of the local oscillator signal;
    at least one IF processor coupled to the RF mixer, the IF processor operable to further downconvert the first downconverted IF signal from the RF mixer to at least one baseband signal, the at least one IF processor being reconfigurable for different RF frequency bands by at least one first control signal received into the at least one IF processor; and
    a programmable frequency divider that receives the local oscillator signal and further receives at least one second control signal to divide the local oscillator signal to generate a plurality of local oscillator clock signals each having both an I-phase and a Q-phase, wherein at least one of the plurality of clock signals is used by the at least one IF processor to downconvert the first downconverted IF signal to a second downconverted IF signal that is used to generate the at least one baseband signal.

2. The apparatus of claim 1, further comprising a position processor coupled to the downconverter, the position processor providing the at least one first and at least one second control signals.

3. The apparatus of claim 1, further comprising an RF synthesizer with fixed VCO frequency and a fixed wideband RF input coupled to the downconverter, wherein all frequency band selection and IF processor reconfiguration is done at IF frequencies.

4. The apparatus of claim 1, wherein the at least one reconfigurable IF processor comprises an image-reject mixer with adjustable polyphase filter, a variable gain amplifier, at least one IF filter with variable bandwidth and frequency, an A/D converter with variable sample-rate capability, and a decimator with programmable decimation ratios.

5. The apparatus of claim 1, wherein the at least one IF processor further comprises at least one fixed IF processor that comprises an image-reject mixer, a variable gain amplifier, at least one IF filter, an A/D converter, and a decimator.

6. The apparatus of claim 1, wherein the range of frequencies encompasses the operational frequencies of both the GPS and Galileo positioning systems.

7. The apparatus of claim 1, wherein the receiver is a positioning receiver using positioning signals transmitted by satellites.

8. A reconfigurable downconverter for a multi-band positioning receiver comprising:
- a fixed frequency local oscillator generating a fixed frequency local oscillator signal
- a radio frequency (RF) mixer operable to accept a predetermined wide range of frequencies and output a first downconverted intermediate frequency (IF) signal under the control of the local oscillator signal;
- a plurality of IF processors coupled to the RF mixer, the IF processors operable to further downconvert the first downconverted IF signal from the RF mixer to a plurality of baseband signals, the plurality of IF processors being reconfigurable for different RF frequency bands by first control signals received into the plurality of IF processors;
- a programmable frequency divider that receives the local oscillator signal and further receives second control signals to divide the local oscillator signal to generate a plurality of local oscillator clock signals each having both an I-phase and a Q-phase and used by the IF processors to downconvert the first downconverted IF signal to second downconverted IF signals that are used to generate the baseband signals; and
- a position processor generating the first and second control signals.

9. The apparatus of claim 8, further comprising a fixed RF synthesizer and a fixed wideband RF input coupled to the downconverter, wherein all frequency band selection and IF processor reconfiguration is done at IF frequencies.

10. The apparatus of claim 8, wherein the reconfigurable IF processors comprises an image-reject mixer with adjustable polyphase filter, a variable gain amplifier, at least one IF filter with variable bandwidth and frequency, an A/D converter with variable sample-rate capability, and a decimator with programmable decimation ratios.

11. The apparatus of claim 8, wherein the range of frequencies encompasses the range from about 1100 MHz to about 1600 MHz.

12. A multi-band positioning receiver comprising:
- a fixed RF synthesizer;
- a fixed wideband RF input;
- a reconfigurable downconverter coupled to the synthesizer and RF input, the downconverter comprising:
  - a fixed frequency local oscillator generating a fixed frequency local oscillator signal;
  - a radio frequency (RF) mixer operable to accept a predetermined wide range of frequencies and output a first downconverted intermediate frequency (IF) signal under the control of the local oscillator signal,
  - a plurality of IF processors coupled to the RF mixer, the IF processors operable to further downconvert the first downconverted IF signal from the RF mixer to a plurality of baseband signal, the plurality of IF processors being reconfigurable for different frequency bands by first control signals received into the plurality of IF processors, and
  - a programmable frequency divider that receives the local oscillator signal and further receives second control signals to divide the local oscillator signal to generate a plurality of local oscillator clock signals each having both an I-phase and a Q-phase and used by the IF processors to downconvert the first downconverted IF signal to second downconverted IF signals that are used to generate the baseband signals; and
- a position processor coupled to the downconverter and generating the first and second control signals.

13. The apparatus of claim 12, wherein the reconfigurable IF processors comprises an image-reject mixer with adjustable polyphase filter, a variable gain amplifier, at least one IF filter with variable bandwidth and frequency, an A/D converter with variable sample-rate capability, and a decimator with programmable decimation ratios.

14. The apparatus of claim 12, wherein the range of frequencies encompasses the range from about 1100 MHz to about 1600 MHz.

15. The apparatus of claim 12, wherein the fixed frequency local oscillator signal coupled to the RF mixer is approximately $1334f_0$, where $f_0=1.023$ MHz.

* * * * *